United States Patent
Haeussler et al.

(10) Patent No.: US 11,780,354 B2
(45) Date of Patent: Oct. 10, 2023

(54) VEHICLE SEAT

(71) Applicant: Bayerische Motoren Werke Aktiengesellschaft, Munich (DE)

(72) Inventors: Peter Haeussler, Munich (DE); Hagen Wlk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/968,916

(22) PCT Filed: Feb. 14, 2019

(86) PCT No.: PCT/EP2019/053617
§ 371 (c)(1),
(2) Date: Aug. 11, 2020

(87) PCT Pub. No.: WO2019/170380
PCT Pub. Date: Sep. 12, 2019

(65) Prior Publication Data
US 2021/0046853 A1 Feb. 18, 2021

(30) Foreign Application Priority Data
Mar. 6, 2018 (DE) ..................... 10 2018 203 311.0

(51) Int. Cl.
*B60N 2/60* (2006.01)
*B60N 2/28* (2006.01)

(52) U.S. Cl.
CPC ............. *B60N 2/6036* (2013.01); *B60N 2/28* (2013.01); *B60N 2/6027* (2013.01); *B60N 2/6045* (2013.01)

(58) Field of Classification Search
CPC ...... B60N 2/6036; B60N 2/28; B60N 2/6027; B60N 2/6045
(Continued)

(56) References Cited

U.S. PATENT DOCUMENTS 5,158,339 A * 10/1992 Miyanaga ............... B60R 22/26
297/224
7,281,763 B1 * 10/2007 Hayashi ............... B60N 2/2893
297/253 X
(Continued)

FOREIGN PATENT DOCUMENTS

| CN | 101096188 A | 1/2008 |
| CN | 103158586 A | 6/2013 |

(Continued)

OTHER PUBLICATIONS

International Search Report (PCT/ISA/210) issued in PCT Application No. PCT/EP2019/053617 dated May 14, 2019 with English translation (four (4) pages).
(Continued)

*Primary Examiner* — Anthony D Barfield
(74) *Attorney, Agent, or Firm* — Crowell & Moring LLP

(57) ABSTRACT

A vehicle seat has a seat pan and a seat back. A fastener is mounted on the seat pan or the seat back for connecting an additional device. A strip-shaped cover can be attached selectively in a position for covering and in a position for uncovering the fastener on the seat pan or the seat back. The strip-shaped cover has a surface made of the same material as the surface of the seat pan and/or of the seat back.

14 Claims, 3 Drawing Sheets

(58) Field of Classification Search
USPC .......................................................... 297/253
See application file for complete search history.

(56) References Cited

U.S. PATENT DOCUMENTS

| | | |
|---|---|---|
| 2013/0221715 A1 | 8/2013 | Mantke et al. |
| 2016/0001682 A1 | 1/2016 | Imayou et al. |
| 2016/0257229 A1 | 9/2016 | Ruthinowski |
| 2017/0259709 A1* | 9/2017 | Shibuya ............... B60N 2/2893 |
| 2017/0259710 A1 | 9/2017 | Oga |

FOREIGN PATENT DOCUMENTS

| | | |
|---|---|---|
| CN | 104936822 A | 9/2015 |
| CN | 105936225 A | 9/2016 |
| CN | 107161046 A | 9/2017 |
| CN | 107161047 A | 9/2017 |
| CN | 107472093 A | 12/2017 |
| DE | 200 15 161 U1 | 12/2000 |
| DE | 103 26 884 B4 | 6/2005 |
| DE | 10 2006 019 738 A1 | 10/2007 |
| DE | 102 43 633 B4 | 9/2008 |
| DE | 10 2005 006 188 B4 | 5/2010 |
| DE | 10 2010 032 378 A1 | 2/2012 |
| DE | 20 2014 008 592 U1 | 3/2016 |
| DE | 10 2015 005 374 A1 | 9/2016 |
| GB | 2537306 A | 10/2016 |
| JP | 2001-277920 A | 10/2001 |
| JP | 2006-182070 A | 7/2006 |
| WO | WO 2012/020125 A1 | 2/2012 |

OTHER PUBLICATIONS

German-language Written Opinion (PCT/ISA/237) issued in PCT Application No. PCT/EP2019/053617 dated May 14, 2019 (five (5) pages).
German-language Search Report issued in German Application No. 10 2018 203 311.0 dated Jul. 31, 2018 with partial English translation (15 pages).
Cover Page of EP 2 603 395 A1 published Jun. 19, 2013.
English translation of Chinese-language Office Action issued in Chinese Application No. 201980014939.4 dated Jan. 27, 2022 (eight (8) pages).

* cited by examiner

VEHICLE SEAT

BACKGROUND AND SUMMARY OF THE INVENTION

The present invention relates to a vehicle seat. In particular, the invention relates to a vehicle seat having a cover for a fastener for connecting an additional device, in particular a child seat. In addition, the invention relates to a vehicle comprising such a vehicle seat.

From the prior art, it is known to fasten child seats according to ISO 13216 to vehicle seats. For this purpose, retaining clips which can engage in the corresponding mating elements of the child seat have to be provided on the vehicle seat, in order thus to connect the child seat to the vehicle seat.

In order to cover the retaining clip, cover caps made of plastic are known. For example, DE 10 2006 019 738 A1 discloses such a cover. Cover caps can be removable but then have a high risk of being lost. Alternatively, the cover caps can be foldable and remain on the vehicle seat, the clearance angle of the mating element of the child seat then being restricted. One alternative to the cover cap is known from DE 10 2010 032 378 A1.

It is an object of the invention to provide a vehicle seat which, with simple and economical manufacture and mounting, permits simple covering and exposure of a fastener for additional devices.

The object is achieved by the features of the independent claim. The subordinate claims contain preferred developments of the invention.

The object is thus achieved by a vehicle seat comprising a seat pan and a seat back. The seat pan and the seat back in particular have a covering which forms the surface of the seat pan and seat back. Attached to the seat pan or the seat back is a fastener, via which an additional device, in particular a child seat, can be connected to the vehicle seat. Advantageously, the fastener is attached at a transition between the vehicle seat pan and the vehicle seat back. If the fastener is not needed to connect the additional device, then the fastener can be covered. To this end, the vehicle seat has a strip-shaped cover. The cover can be attached selectively in a position for covering and in a position for uncovering the fastener on the seat pan or the seat back.

Provision is made for the strip-shaped cover to have a surface made of the same material as the surface of the seat pan and/or the seat back. Thus, provision is preferably made for the cover to have a covering which is identical to the covering of the seat pan and/or seat back. Thus, the fastener can be covered reliably when not being used. It is therefore protected against external influences. Likewise, simple exposure of the fastener is provided. For example, the strip-shaped cover can be removed easily from the fastener, so that access to the fastener is unrestrictedly possible.

Particularly advantageously, a continuous, homogeneous appearance is ensured, so that the cover does not stand out visually with respect to the seat pan and/or the seat back. This additionally simplifies the manufacture of the cover, since the same material can be used to produce the surface of the cover as for the surfaces of the seat pan and/or seat back. In particular, it is possible to use the same covering as is already attached to the seat pan or the seat back.

Preferably, the seat pan and/or the seat back have an opening. The opening is used to reach the fastener, which is advantageously arranged within the seat pan or the seat back. The opening can be covered, in particular completely, by the strip-shaped cover. Thus, the fastener cannot be seen when the covering element is arranged in the covering position. This leads to reliable protection of the fastener and to a high-quality visual impression. Since the surfaces of the seat pan and/or seat back and of the cover are the same, a homogeneous overall image of the vehicle seat is provided.

Particularly advantageously, the cover has a reinforcing element. The reinforcing element is in particular a plastic plate, which is particularly preferably surrounded by the previously described covering. Thus, the reinforcing element is not a visible part of the cover. In addition, provision is made for the reinforcing element to have a greater dimension than the opening. Thus, stability of the cover when covering the opening is provided. In particular, the cover cannot be forced into the opening but always remains outside the opening. Therefore, a stable and reliable covering of the fastener is provided.

Advantageously, the cover has a first end and a second end opposite the first end. The first end and the second end in particular represent edge regions on a short end of the strip-shaped cover. For example, provision is advantageously made for the cover to have the shape of a rectangle, which has two short edges and two long edges. The short edges represent the first end and the second end. At the first end, the strip-shaped cover is non-detachably arranged on a first side of the fastener. Particularly advantageously, the cover is thus non-detachably connected to the seat pan and/or the seat back on a first side of the opening. By the second end, opposite the first end, the cover can be detachably attached to a second side of the fastener, opposite the first side. If the second end is attached to the second side of the fastener, which in particular corresponds to a second side of the opening, then the fastener, in particular the opening, is completely covered. If the cover is detached from the seat pan and/or the seat back at the second end, then the fastener can be exposed. As a result of the non-detachable attachment of the first end to the seat pan and/or the seat back, it is ensured that the cover cannot be lost. At the same time, the fastener can be exposed simply and with little effort.

Particularly advantageously, provision is made for the first end to be attached rotatably to the seat pan and/or the seat back. Thus, the fastener can be exposed by the cover at the first end being rotated with respect to the seat pan and/or the seat back. As a result, it is in particular made possible to transfer the cover into a non-interfering position when the fastener is needed to connect the additional device.

Particularly advantageously, the second end has at least one press stud and/or at least one permanent magnet and/or at least one hook and loop fastener for attaching the cover to the seat pan and/or the seat back. Thus, the second end of the cover can be fastened to the seat pan and/or to the seat. This is advantageous in particular when the cover is arranged in the covering position. This thus prevents the fastener from being exposed inadvertently. At the same time, the fastening of the second end can be detached simply and with little expenditure of force when the fastener is to be exposed.

In a further preferred embodiment, provision is made for the second end to be clamped firmly in a groove in the seat pan and/or the seat back, arranged on the second side of the cover. Thus, no additional fastener is needed on the second end. Instead, the second end can be fixed by the firm clamping, by which means the same advantages as those previously described result. The groove can in particular be a basting groove in the vehicle seat.

In the position provided to expose the fastener, the cover can be clamped within a slot in the vehicle seat and/or the vehicle backrest. The aforementioned slot can in particular be a groove. Likewise, the slot can be formed by two different partial elements of the vehicle seat butting up against each other. Provision is advantageously made for the cover to be fastened in the slot, in particular rotatably, by the first end. Thus, the cover can be supported simply and with little effort in the slot when covering the fastener. As a result, the risk of losing the fastener is minimized.

Advantageously, the fastener is an eyelet or a clip according to ISO 13216. Thus, a child seat can advantageously be fastened to the fastener. As a result of the configuration of the cover, a connector of the child seat has a high clearance angle of the attachment to the fastener.

Finally, the invention relates to a vehicle. The vehicle is in particular a passenger car. The vehicle comprises a vehicle seat as previously described. Thus, the vehicle has a homogeneous interior when the cover covers the fastener. In addition, the fastener can be covered and exposed simply and with little effort.

Further details, features and advantages of the invention can be gathered from the following description and the figures.

DETAILED DESCRIPTION OF THE DRAWINGS

Figure 1:
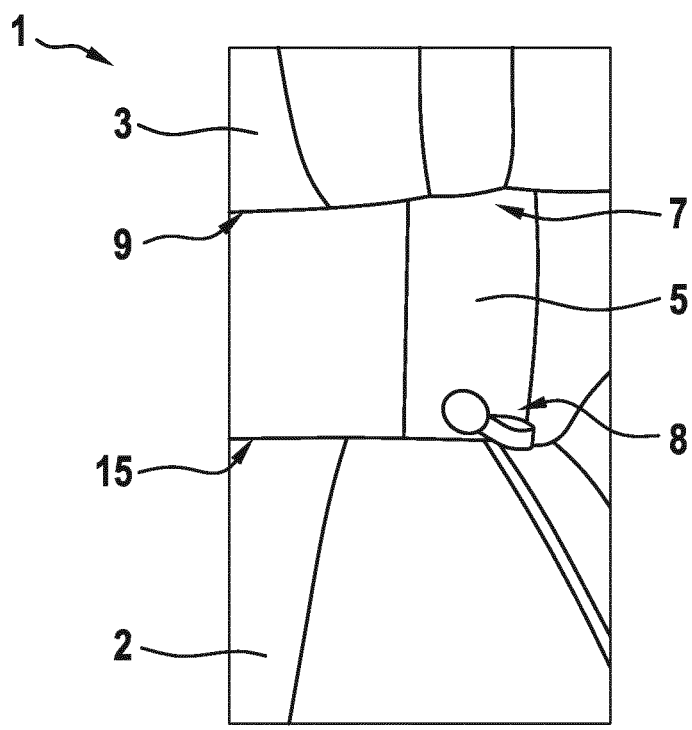
FIG. 1 shows a first schematic view of a section of a vehicle seat according to an exemplary embodiment of the invention.

FIGS. 1 to 4 each show schematic views of a detail from a vehicle seat 1 according to an exemplary embodiment of the invention. The vehicle seat 1 comprises a seat back 3 and a seat pan (bottom) 2. On the seat pan 2 and/or the seat back 3, in particular in a transition region between the seat pan 2 and seat back 3, there is a fastener 4 (cf. FIGS. 3 and 4), which in particular is an eyelet or a clip according to ISO 13216. Thus, a child seat 13 (cf. FIG. 5) can be attached to the fastener 4.

Figure 2:
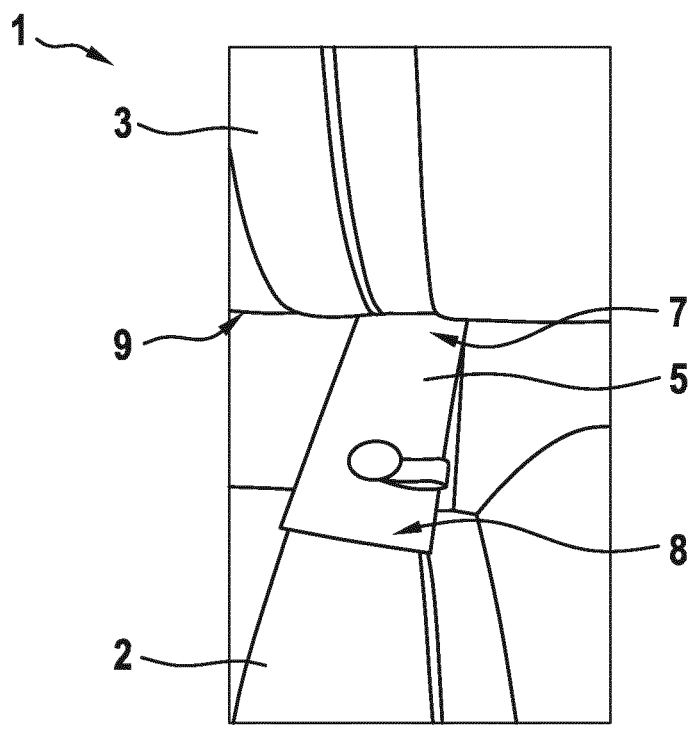
FIG. 2 shows a second schematic view of the section of the vehicle seat according to the exemplary embodiment of the invention.
Figure 3:
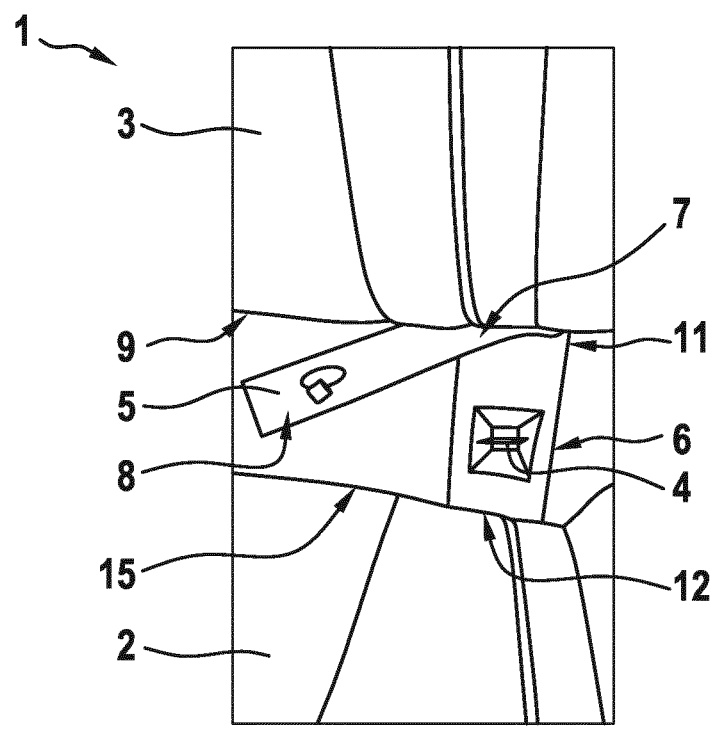
FIG. 3 shows a third schematic view of the section of the vehicle seat according to the exemplary embodiment of the invention.
Figure 4:
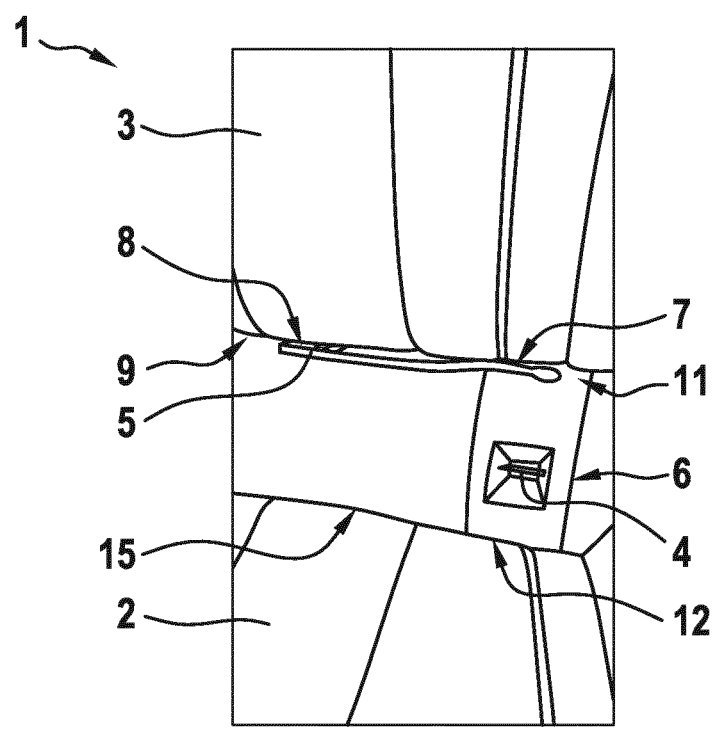
FIG. 4 shows a fourth schematic view of the section of the vehicle seat according to the exemplary embodiment of the invention.

The vehicle seat 1 additionally has a cover 5. The cover 5 is used for selectively covering and exposing the fastener 4. FIG. 1 shows how the cover 5 covers the fastener 4 completely. FIG. 4 shows how the cover 5 exposes the fastener 4 completely. In FIGS. 2 and 3, intermediate states between the complete coverage and the complete exposure are shown. These will be assumed in particular when the cover is transferred between a covering state and an exposing state.

The fastener 4 is arranged within the seat back 3. The seat back 3 has an opening 6, which permits access to the fastener 4. In addition, the fastener 4, and therefore the opening 6, has a first side 11 and a second side 12. The first side 11 and the second side 12 are opposite each other and are arranged beside each other in the vertical direction. Located on the first side 11 is a slot 9, there being a groove 15 on the second side 12. The groove 15 is in particular a basting groove of the vehicle seat 1.

The cover 5 is strip-shaped and has a first end 7 and a second end 8. As a result of the strip shape, the cover 5 is in particular rectangular, the first end 7 and the second end 8 representing the short edges of the rectangular shape.

The cover 5 has a surface made of the same material as the surface of the seat pan 2 and/or the seat back 3. In particular, the cover 5 has a reinforcing element (not illustrated) in the form of a plastic plate, which is surrounded by a covering. The aforesaid covering is identical to a covering of the seat pan 2 and/or the seat back 3. Thus, firstly simple and low-effort production of the cover 5 is provided, since the same materials as for the production of the surface of seat pan 2 and/or seatback 3 are used. Secondly, a homogeneous view of the vehicle seat 1 is ensured when the cover 5 is in the position covering the fastener 4.

The cover 5, in particular the plastic plate which is present, preferably has a dimension which is greater than the opening 6. Thus, the opening 6 can be covered safely and reliably, access to the fastener 4 no longer being possible. In addition, a high-quality impression of the vehicle seat is imparted.

The first end 7 of the cover 5 is non-detachably coupled to the seat back 3 at the slot 7 and therefore on the first side 11 of the opening 6. Thus, in particular, complete removal of the cover 5 from the vehicle seat 1 is avoided. Inadvertent loss of the cover 5 is therefore ruled out.

When the cover 5 is in the covering position, shown in FIG. 1, then fixing of the second end 8 to the seat back 3 and/or the seat pan 2 is preferably carried out. On the one hand, this can be carried out by clamping firmly in the groove 15. Alternatively, the second end 8 of the cover 5 can have at least one press stud, at least one permanent magnet and/or a hook and loop fastener element for the attachment of the cover 5 to the seat pan 2 and/or the seat back 3. In any case, secure and reliable fixing of the second end 8 of the cover 5 to the second side 12 of the fastener 4 is carried out.

If the fastener 4 is to be exposed by the cover 5, the cover 5 is advantageously placed in the slot 9. In this case, there is access to the fastener 4 which is not restricted by the cover 5. Attaching the child seat 13 to the vehicle seat 1 is not hampered thereby.

Figure 5:
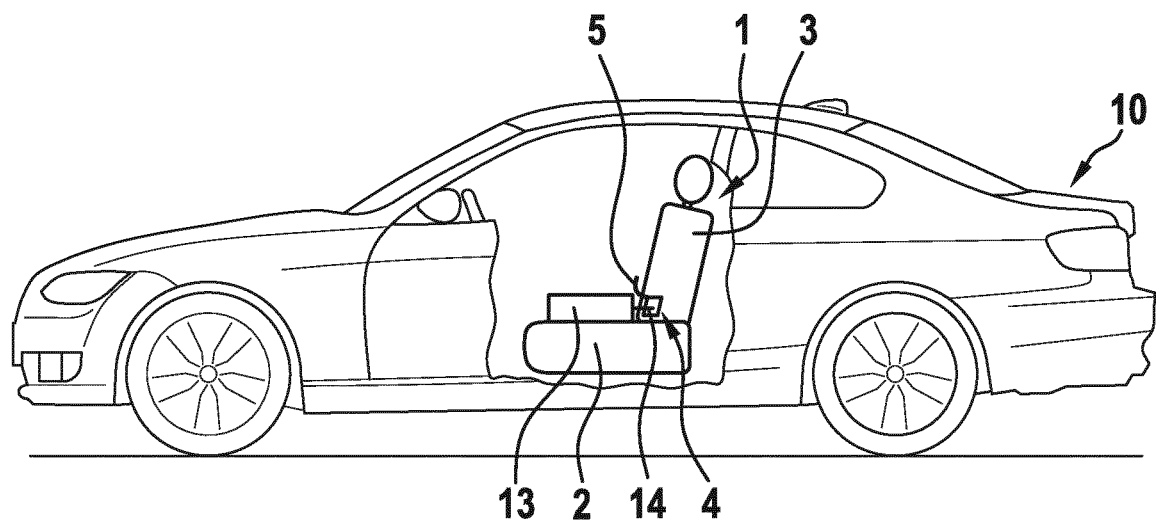
FIG. 5 shows a schematic view of a vehicle according to an exemplary embodiment of the invention.

FIG. 5 shows, schematically, a vehicle 10 according to an exemplary embodiment of the invention. The vehicle 10 has a vehicle seat 1 as previously described. Provision is made, for example, for a child seat 13, which is arranged on the fastener by at least one connector 14, to be placed on the vehicle seat 10. If the child seat 1 is not used, the vehicle 10 has a visually high-quality interior because of the covers 5, since each fastener 4 is provided with a cover 5 having the same surface as the seat back 3 and/or the seat pan 2. The vehicle seat 1 can in particular be a passenger seat, a rear seat or a portion of a backseat of the vehicle.

LIST OF DESIGNATIONS

1 Vehicle seat
2 Seat pan
3 Seat back
4 Fastener
5 Cover
6 Opening
7 First end
8 Second end
9 Interspace
10 Vehicle
11 First side
12 Second side 13 Additional device
14 Connector

What is claimed is:
1. A vehicle seat, comprising:
a seat pan and a seat back;
a slot formed between the seat pan and the seat back;
a fastener attached to the seat pan or the seat back for connecting an additional device; and
a strip-shaped cover, which is attachable selectively in a position for covering and in a position for exposing the fastener on the seat pan or the seat back, wherein
the strip-shaped cover has a surface made of a same material as a surface of the seat pan and/or the seat back,
in the position for exposing the fastener the strip-shaped cover is held in said position via an interaction with the seat back,
in the position for covering, the strip-shaped cover extends along a first axial direction, and
in the position for exposing, the strip-shaped cover extends along a second axial direction orthogonal to the first axial direction in which the strip-shaped cover is tucked into the slot such that the fastener is exposed and the strip-shaped cover is not visible.
2. The vehicle seat according to claim 1, wherein
the seat pan or the seat back has an opening for reaching the fastener, and
the opening is coverable by the strip-shaped cover.
3. The vehicle seat according to claim 2, wherein
the cover has a reinforcing element, which is a plastic plate and which has a greater dimension than the opening.
4. The vehicle seat according to claim 1, wherein
a first end of the strip-shaped cover is non-detachably arranged on a first side of the fastener, and
a second end opposite to the first end is detachably attached to a second side of the fastener, which is opposite the first side.
5. The vehicle seat according to claim 4, wherein
the first end is attached rotatably to the seat pan and/or the seat back.
6. The vehicle seat according to claim 4, wherein
the second end has at least one press stud, at least one permanent magnet, and/or a hook and loop fastener for attaching the cover to the seat pan and/or the seat back.
7. The vehicle seat according to claim 4, wherein
the second end is clampable firmly in a groove in the seat pan and/or the seat back, arranged on the second side of the cover.
8. The vehicle seat according to claim 4, wherein
in a position provided to expose the fastener, the cover is clampable within a slot of the vehicle seat and/or the vehicle backrest.
9. The vehicle seat according to claim 1, wherein
the fastener is an eyelet or a clip according to a given ISO standard.
10. The vehicle seat according to claim 2, wherein
the cover completely covers the opening.
11. The vehicle seat according to claim 5, wherein
the second end has at least one press stud, at least one permanent magnet, and/or a hook and loop fastener for attaching the cover to the seat pan and/or the seat back.
12. The vehicle seat according to claim 5, wherein
the second end is clampable firmly in a groove in the seat pan and/or the seat back, arranged on the second side of the cover.
13. The vehicle seat according to claim 6, wherein
the second end is clampable firmly in a groove in the seat pan and/or the seat back, arranged on the second side of the cover.
14. A vehicle comprising a vehicle seat according to claim 1.

* * * * *